US011935351B2

(12) United States Patent
Kure et al.

(10) Patent No.: US 11,935,351 B2
(45) Date of Patent: Mar. 19, 2024

(54) PAPER SHEET PROCESSING APPARATUS AND PAPER SHEET PROCESSING METHOD

(71) Applicants: Kabushiki Kaisha Toshiba, Tokyo (JP); Toshiba Infrastructure Systems & Solutions Corporation, Kawasaki (JP)

(72) Inventors: Shota Kure, Kanagawa (JP); Takahisa Nakano, Kanagawa (JP); Seiji Ikari, Kanagawa (JP)

(73) Assignees: Kabushiki Kaisha Toshiba (JP); Toshiba Infrastructure Systems & Solutions Corporation (JP)

( * ) Notice: Subject to any disclaimer, the term of this patent is extended or adjusted under 35 U.S.C. 154(b) by 469 days.

(21) Appl. No.: 17/205,736

(22) Filed: Mar. 18, 2021

(65) Prior Publication Data

US 2021/0209886 A1 Jul. 8, 2021

Related U.S. Application Data

(63) Continuation of application No. PCT/JP2019/035791, filed on Sep. 11, 2019.

(30) Foreign Application Priority Data

Sep. 19, 2018 (JP) ................. 2018-175210

(51) Int. Cl.
*G01N 21/64* (2006.01)
*G07D 7/1205* (2016.01)
(Continued)

(52) U.S. Cl.
CPC ....... *G07D 7/1205* (2017.05); *G01N 21/6456* (2013.01); *G07D 7/17* (2017.05);
(Continued)

(58) Field of Classification Search
CPC .......... G07D 7/1205; G07D 7/17; G07D 7/12; G07D 7/121; G07D 11/16; G07D 2211/00;
(Continued)

(56) References Cited

U.S. PATENT DOCUMENTS

| 2009/0208065 A1 | 8/2009 | Miura et al. |
| 2010/0102237 A1 | 4/2010 | Nomura |
| 2017/0153184 A1 | 6/2017 | Bogaki et al. |

FOREIGN PATENT DOCUMENTS

| EP | 2290622 A2 | 3/2011 |
| EP | 2706511 A1 | 3/2014 |

(Continued)

OTHER PUBLICATIONS

International Search Report and Written Opinion issued in related PCT Application No. PCT/JP2019/035791, dated Nov. 19, 2019, 7 pages.

(Continued)

*Primary Examiner* — Jurie Yun
(74) *Attorney, Agent, or Firm* — Baker Botts L.L.P.

(57) ABSTRACT

According to one embodiment, a paper sheet processing apparatus includes a conveyance mechanism which conveys a paper sheet with fluorescent ink print information along a conveyance path, a fluorescence reference member including a fluorescent material and arranged to oppose to the conveyance path, a light source device which irradiates the fluorescence reference member with excitation light, and an imaging device which images the fluorescence emission of the fluorescence reference member and acquires an image including a contour of the paper sheet passing over the fluorescence reference member and an image of the fluorescent ink print information of the paper sheet.

8 Claims, 11 Drawing Sheets

(51) Int. Cl.
    *G07D 7/17*     (2016.01)
    *G07D 11/16*    (2019.01)
(52) U.S. Cl.
    CPC ......... *G07D 11/16* (2019.01); *G07D 2207/00* (2013.01); *G07D 2211/00* (2013.01)
(58) Field of Classification Search
    CPC . G07D 2207/00; G01N 21/64; G01N 21/6456
    See application file for complete search history.

(56)             References Cited

FOREIGN PATENT DOCUMENTS

| JP | H09-231311 A   | 9/1997  |
| JP | 2007-064832 A  | 3/2007  |
| JP | 2007-066059 A  | 3/2007  |
| JP | 2009-199182 A  | 9/2009  |
| JP | 2010-039897 A  | 2/2010  |
| JP | 2010-101835 A  | 5/2010  |
| JP | 2011-118457 A  | 6/2011  |
| JP | 2012-093987 A  | 5/2012  |
| JP | 2015-222463 A  | 12/2015 |
| JP | 2017-038324 A  | 2/2017  |
| WO | 2010/018353 A1 | 2/2010  |

OTHER PUBLICATIONS

Extended European Search Report issued in European Patent Application No. 19861426.5 dated Apr. 14, 2022, 7 pages.

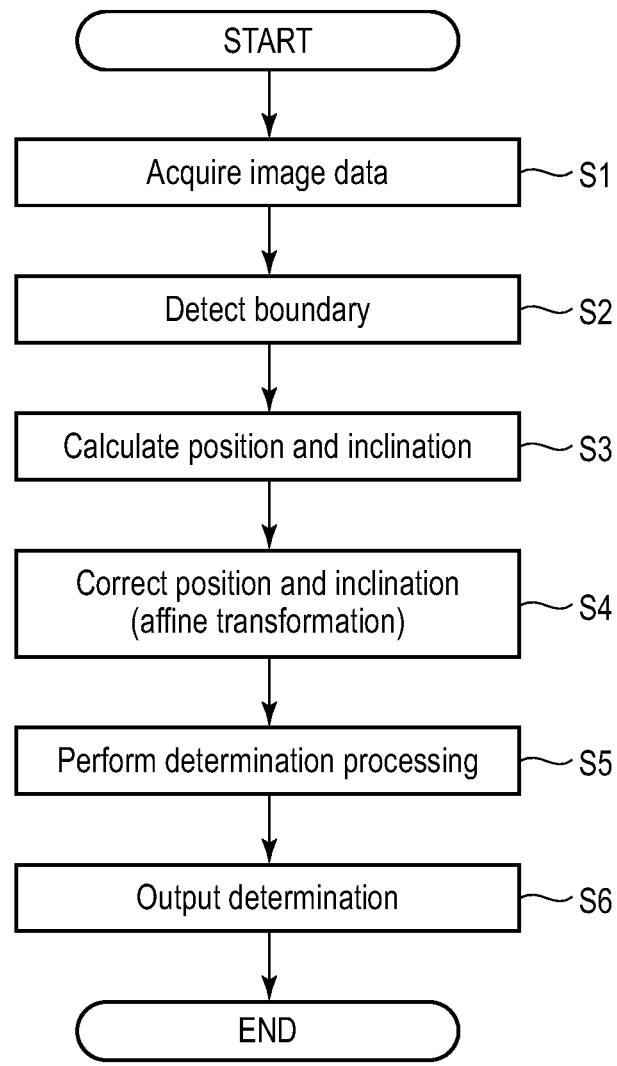
F I G. 14

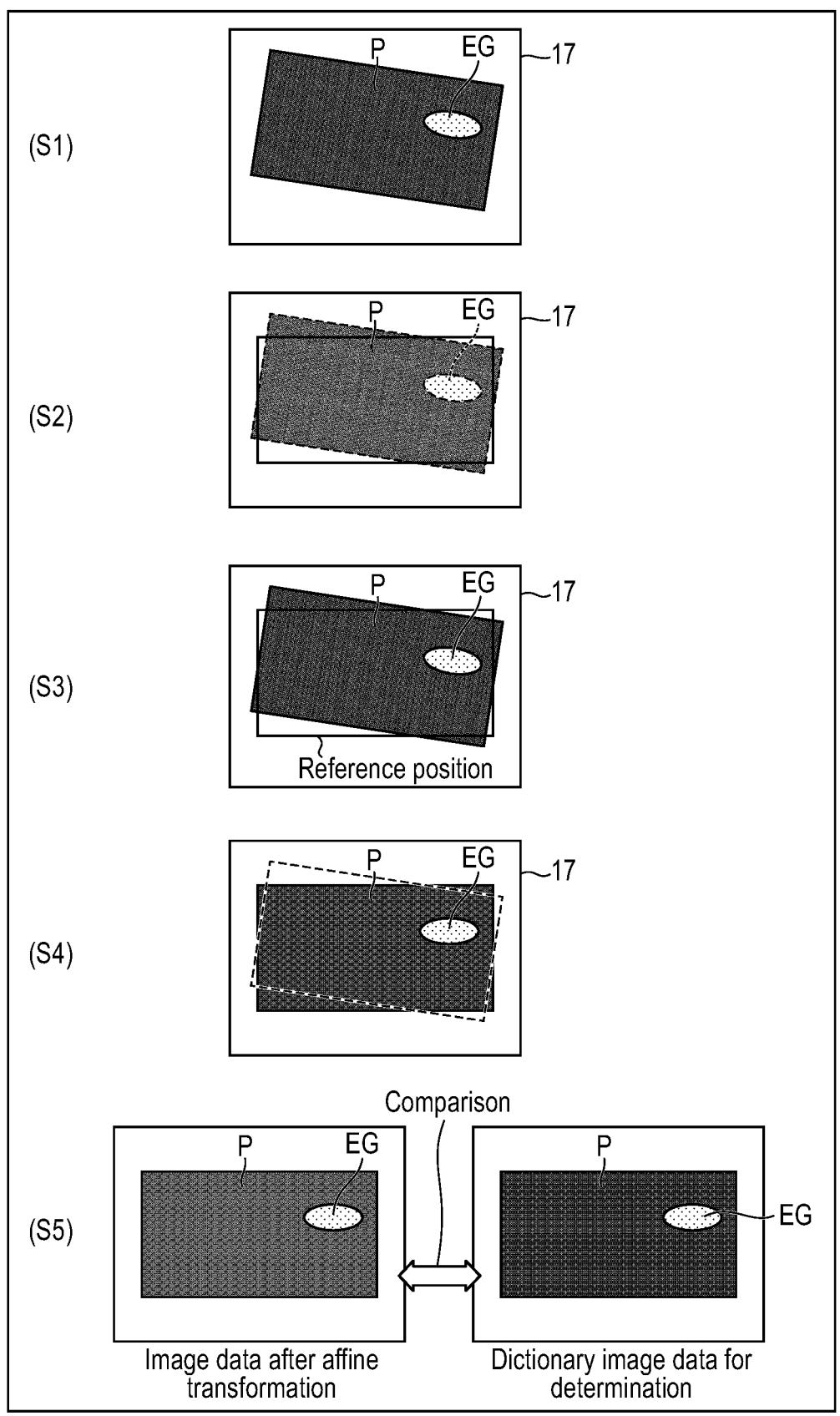
F I G. 15

PAPER SHEET PROCESSING APPARATUS AND PAPER SHEET PROCESSING METHOD

CROSS-REFERENCE TO RELATED APPLICATIONS

This application is a Continuation Application of PCT Application No. PCT/JP2019/035791, filed Sep. 11, 2019 and based upon and claiming the benefit of priority from Japanese Patent Application No. 2018-175210, filed Sep. 19, 2018, the entire contents of all of which are incorporated herein by reference.

FIELD

Embodiments described herein relate generally to a paper sheet processing apparatus for processing a paper sheet and a paper sheet processing method.

BACKGROUND

In recent years, a large number of bills have been handled on a daily basis in banks and large-scale retailers, etc., and have been sorted according to their types and whether they are normal or damaged (the uncleanness and damage to bills). As apparatuses for automating this operation to sort bills, paper sheet processing apparatuses have been used. A paper sheet processing apparatus comprises, for example, an inspection section which inspects each bill for the type and damage, a plurality of accumulation sections which classify and accumulate bill according to their types, and the like.

The inspection section is configured to include an image reading device which acquires an image of each bill, a fluorescence detection device which detects fluorescence printing of each bill, and various other sensors. The image reading device detects the type, uncleanness, skew, etc., of each bill from a read image.

BRIEF DESCRIPTION OF THE DRAWINGS

FIG. 14 is a flowchart showing image processing steps in the image reading device.

FIG. 15 is a view schematically showing acquired images corresponding to the respective steps of the image processing steps.

DETAILED DESCRIPTION

Figure 1:
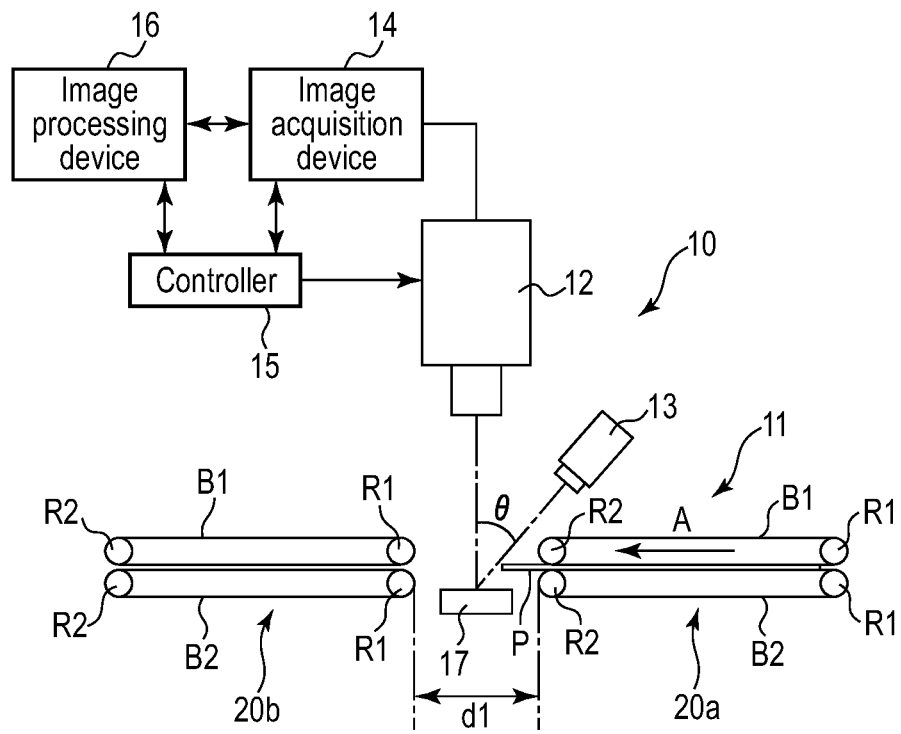
FIG. 1 is a side view schematically showing an image reading device according to a first embodiment.

Various embodiments will be described hereinafter with reference to the accompanying drawings.

In general, according to one embodiment, a paper sheet processing apparatus comprises a conveyance mechanism which conveys a paper sheet with fluorescent ink print information along a conveyance path; a fluorescence reference member which includes a fluorescent material which exhibits fluorescence emission at an excitation light wavelength common to the fluorescent ink print information, and is arranged to oppose to the conveyance path including a passing area of the paper sheet; a light source device which irradiates the fluorescence reference member with excitation light; and an imaging device which images the fluorescence emission of the fluorescence reference member and acquires an image including a contour of the paper sheet passing over the fluorescence reference member and an image of the fluorescent ink print information of the paper sheet.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
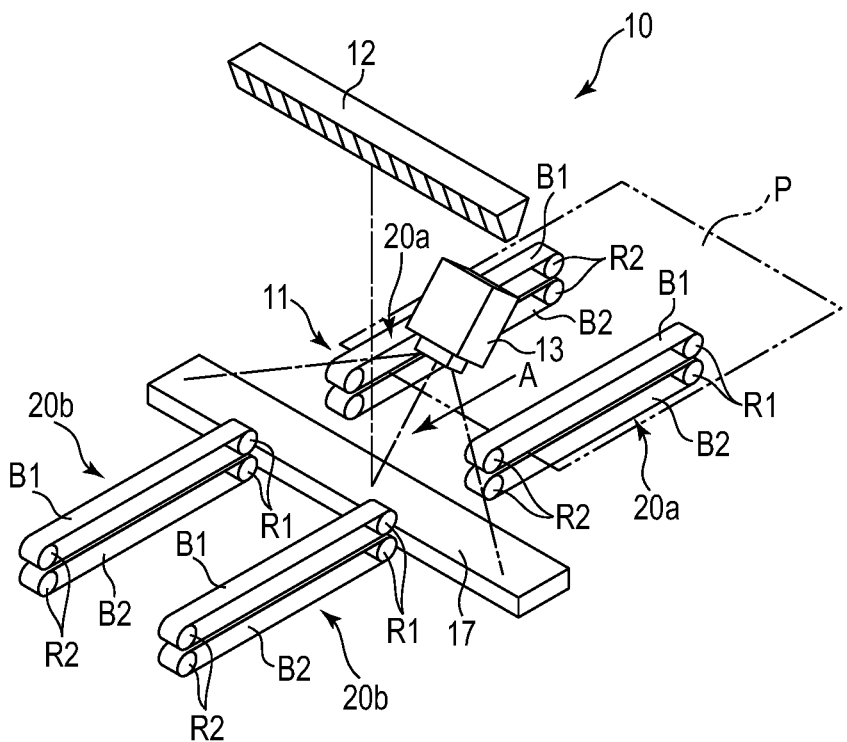
FIG. 2 is a perspective view of the image reading device.
Figure 3:
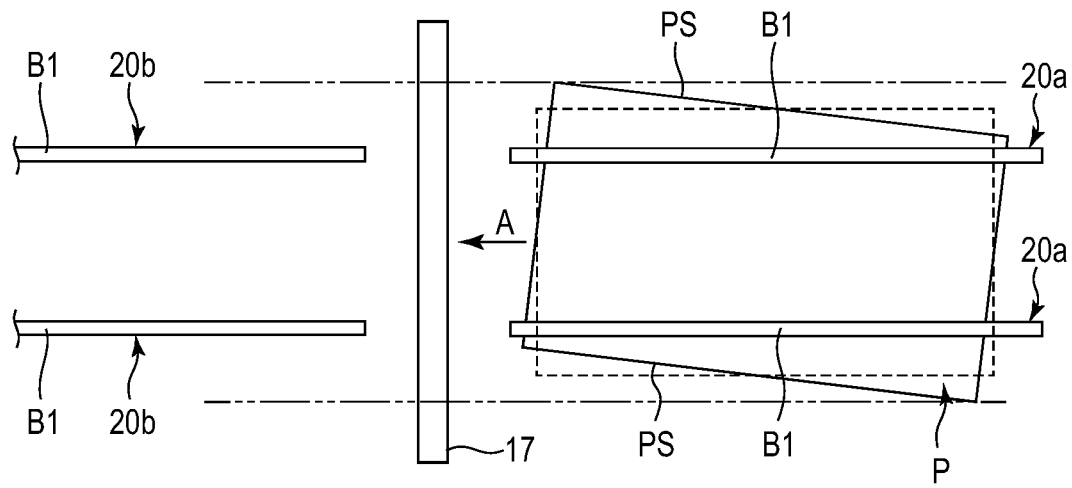
FIG. 3 is a plan view schematically showing a conveyance mechanism and a fluorescence reference member of the image reading device.

FIG. 1 is a side view schematically showing an image reading device according to a first embodiment as an example of a paper sheet processing apparatus, FIG. 2 is a perspective view of the image reading device, and FIG. 3 is a plan view schematically showing a part of the image reading device.

As shown in FIGS. 1 and 2, an image reading device 10 includes a conveyance mechanism 11 which conveys a bill P which is an example of paper sheets along a predetermined conveyance path, a fluorescence reference member 17 arranged so as to face the middle portion of the conveyance path, an imaging device 12, a light source device 13, an image acquisition device 14, a controller 15, and an image processing device 16.

The conveyance mechanism 11 includes a plurality of conveyance rollers R1 and R2, a plurality of endless conveyance belts B1 and B2 wound around the conveyance rollers R1 and R2, and a drive source (not shown) which rotates at least one of the conveyance rollers R1 and R2. The conveyance belts B1 and B2 are arranged in pairs so as to face each other, and convey the banknote P with the bill P sandwiched between these conveyance belts. In the present embodiment, the conveyance mechanism 11 includes two first conveyance belts pairs 20a arranged parallel to each other and two second conveyance belt pairs 20b arranged parallel to each other. The two first conveyance belt pairs 20a are arranged parallel to the conveyance path and so as to face each other at a distance narrower than the width of the bill P. The two second conveyance belt pairs 20b are arranged parallel to the conveyance path and so as to face each other at a distance narrower than the width of the bill P. Further, the second conveyance belt pairs 20b are arranged so as to be spaced apart from the first conveyance belt pairs 20a by a predetermined distance d1 in a conveying direction A. Each second conveyance belt pair 20b is aligned with the corresponding first conveyance belt pair 20a in the conveying direction A.

The conveyance mechanism 11 may further include a plurality of conveyance belt pairs. Further, the conveyance mechanism 11 may be configured such that each endless belt is provided with a plurality of through holes arranged in the conveying direction, and the bill P is sucked by a suction means through these through holes and attracted to the conveyance belt.

The fluorescence reference member 17 is formed of, for example, a quartz glass plate having a surface coated with fluorescent ink, and exhibits fluorescence emission at an intensity corresponding to the intensity of excitation illumination to be radiated. The fluorescence reference member 17 is formed, for example, in an elongated flat plate shape. The fluorescence reference member 17 is arranged at a position that does not interfere with the conveyance belts B1 and B2 of the conveyance mechanism 11. In the present embodiment, the fluorescence reference member 17 is arranged between the first conveyance belt pairs 20a and the second conveyance belt pairs 20b so as to face the conveyance path. Further, the fluorescence reference member 17 is arranged so that one surface faces parallel to the conveyance path, for example, one surface faces upward in the vertical direction. In the example shown in FIG. 1, the fluorescence reference member 17 is arranged below the conveyance path.

As shown in FIGS. 2 and 3, the fluorescence reference member 17 extends in a direction intersecting the conveying direction A, for example, in a direction orthogonal to the conveying direction A. According to the present embodiment, the fluorescence reference member 17 is formed to have a length sufficiently larger than the width of the bill P. Both ends of the fluorescence reference member 17 in the longitudinal direction each extend to the outside of the conveyance path for the bill P. That is, both the ends of the fluorescence reference member 17 are provided at positions facing both side edges PS of the bill P to be conveyed. As a result, in any of the case where the bill P is in the reference position shown by the broken line in FIG. 3, the case where the bill P is inclined (skewed) with respect to the conveying direction A as shown by the solid line in FIG. 3, and the case where the bill P is displaced (slid) with respect to the reference position, the fluorescence reference member 17 faces the entire surface including both the side edges PS of the bill P passing over the fluorescence reference member 17 and a certain area on the outside of the side edges PS.

As shown in FIGS. 1 and 2, the light source device 13 is an illumination device for excitation which irradiates the fluorescence reference member 17 and the bill P with light for exciting fluorescence emission, and includes, as a light source, for example, a xenon lamp, a mercury lamp, a metal halide lamp, an LED, or the like. The light source device 13 is arranged on the side opposite to the fluorescence reference member 17 with respect to the conveyance path, that is, above the conveyance path in the figure. The light source device 13 is provided on the upstream side in the conveying direction A with respect to the fluorescence reference member 17. The light source device 13 is arranged so that its optical axis forms an angle $\theta$ with respect to a direction perpendicular to the fluorescence reference member 17. The light source device 13 functions to irradiate the entire upper surface of the fluorescence reference member 17 with excitation light to cause the fluorescence reference member 17 to emit fluorescence, and also irradiate the bill P passing over the fluorescence reference member 17 with excitation light to cause a fluorescent ink print area in the bill P to emit fluorescence.

The imaging device 12 includes a line image sensor (for example, monochrome line CCD or line CMOS) or a camera which sequentially images the conveyed bill P one-dimensionally. In the present embodiment, a line image sensor is used as the imaging device 12. This line image sensor includes a plurality of light receiving elements (light receiving sensors) provided side by side in the direction orthogonal to the conveying direction A. The imaging device 12 is arranged above the conveyance path and faces the fluorescence reference member 17 with the conveyance path in between. Further, the imaging device 12 extends in the direction orthogonal to the conveying direction A and faces substantially the entire upper surface of the fluorescence reference member 17. The line image sensor constituting the imaging device 12 includes a plurality of imaging elements (pixels) which each convert the received light into an electric signal, that is, an image signal, and these imaging elements are arranged in a plurality of rows. The imaging device 12 sequentially images a predetermined range (imaging range) through which the bill P passes by the line image sensor, and acquires an image.

The image acquisition device 14 performs various processes such as AGC correction and A/D conversion on the image imaged by the imaging device 12. The controller 15 comprehensively controls the operations of the light source device 13, the imaging device 12, the image acquisition device 14, the image processing device 16, and the conveyance mechanism 11. The controller 5 includes a memory which functions as a storage means. The memory includes, for example, a ROM, a RAM, a non-volatile memory, or the like. The memory stores in advance a program for control, control data, an image that serves as a reference for determining the bill P, and the like. In addition, the RAM functions as a working memory, and the controller 15 temporarily stores data and the like being processed. The non-volatile memory accumulates and stores the image read from the bill P processed by this device.

The image processing device 16 detects and corrects the position and the inclination of the bill P, calculates the image feature amount, and determines the type of the bill P and the like based on the image acquired by the imaging device 12.

More detailed configurations of the image acquisition device 14, the controller 15, and the image processing device 16 will be described later.

The operation of imaging a fluorescent image by the image reading device 10 will be described.

Figure 4:
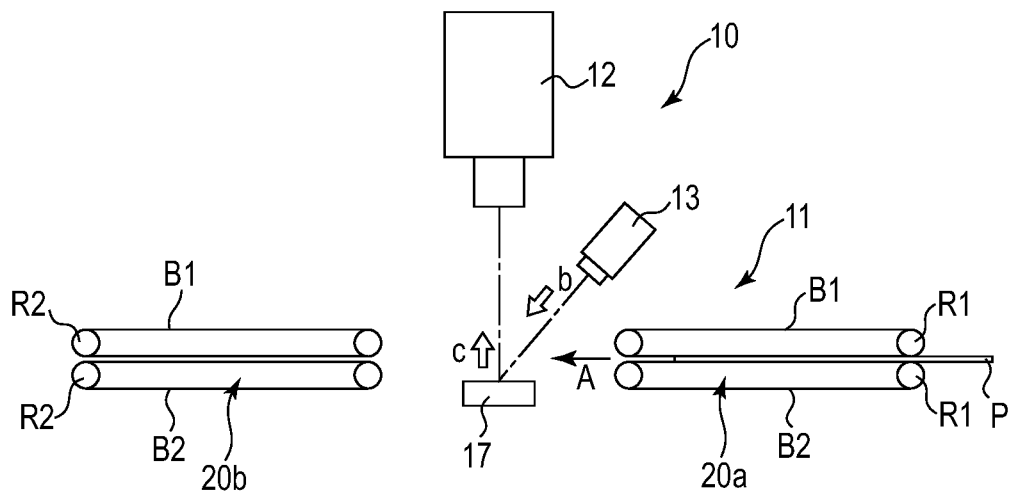
FIG. 4 is a side view showing an operating state of the image reading device.
Figure 5:
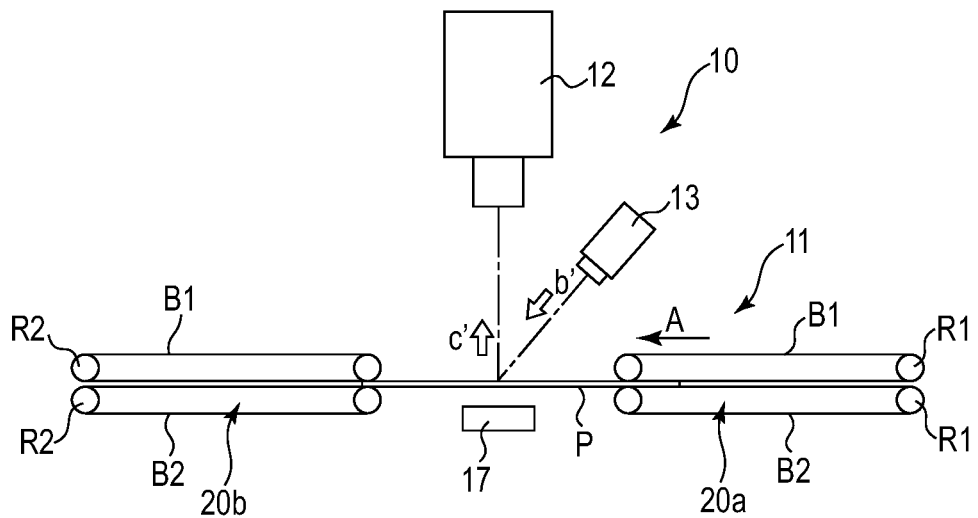
FIG. 5 is a side view showing another operating state of the image reading device.

FIGS. 4 and 5 are side views schematically showing different operating states of the image reading device 10. As shown in FIG. 4, when the bill P is not present in the imaging range of the imaging device 12, excitation light b emitted from the light source device 13 is radiated onto the entire area of the fluorescence reference member 17. As a result, the fluorescence reference member 17 is excited to generate fluorescence emission. The imaging device 12 receives fluorescence emission C (fluorescence emission range) generated in the imaging range. During this time, the imaging device 12 may detect the intensity of the received fluorescence emission and correct the light receiving sensitivity of the imaging device 12 based on the detected intensity.

Next, as shown in FIG. 5, under the control of the controller 15, the conveyance mechanism 11 conveys the bill P to the imaging range by driving the conveyance belts B1 and B2. The bill P is conveyed by the conveyance mechanism 11 in the conveying direction A along the conveyance path so as to be caused to pass over the fluorescence reference member 17, that is, the bill P is conveyed through the fluorescence emission range. At the same time, the light source device 13 irradiates the imaging range through which the bill P passes with the excitation light b. The radiated excitation light b excites the fluorescent ink area printed on the bill P to generate fluorescence emission C'. The imaging device 12 receives the fluorescence emission generated in the imaging range. In this way, the image reading device 10 can acquire the fluorescent image of the bill P by imaging the fluorescence emission range.

Figure 6:
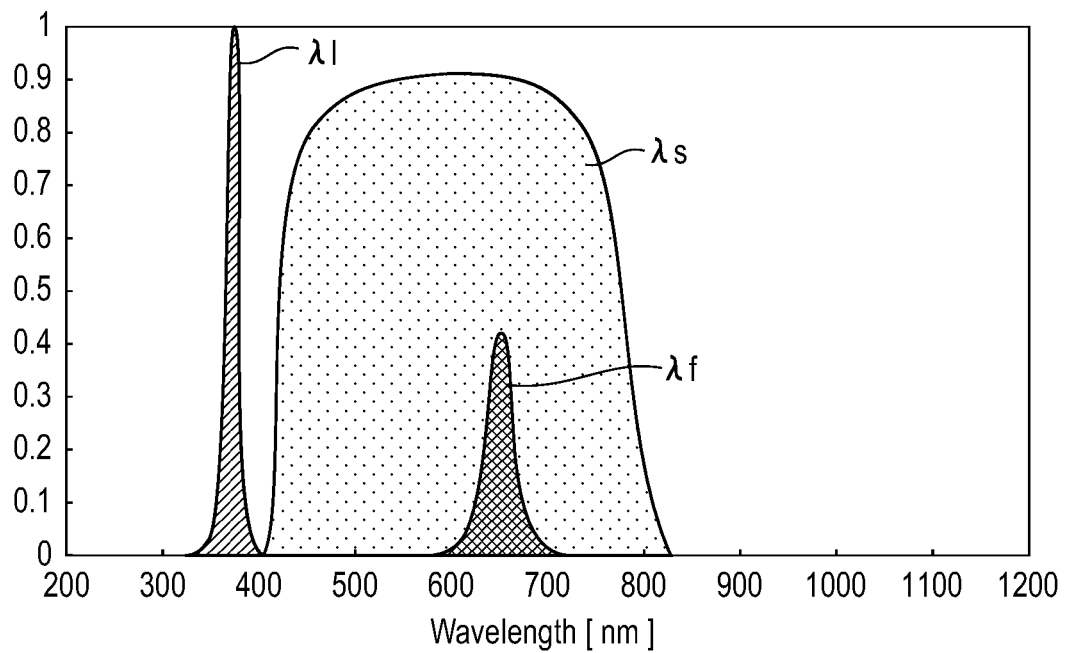
FIG. 6 is a diagram schematically showing wavelength distributions of an imaging device, a light source device, and a phosphor of the image reading device.

FIG. 6 is a schematic diagram showing examples of a wavelength λ1 of the excitation light emitted by the light source device 13, a sensitivity wavelength λS of the imaging device 12, and a fluorescence emission wavelength λf of the fluorescence reference member 17 and the fluorescent ink print area in the bill P. As shown in the figure, the sensitivity wavelength λS of the imaging device 12 is set to, for example, a visible light wavelength (400 to 800 nm). The wavelength λ1 of the excitation light is, for example, an ultraviolet wavelength (350 to 390 nm), and is set outside the range of the sensitivity wavelength λS. The fluorescence emission wavelength λf is, for example, a red light wavelength, and is set within the range of the sensitivity wavelength λS.

When the wavelength λ1 of the excitation light, the sensitivity wavelength λS, and the fluorescence emission wavelength λf are selected as described above, it is possible to suppress the excitation light wavelength λ1 from entering the imaging device 12 as noise. Various wavelengths other than the fluorescence wavelength of white paper sheets can be optionally selected by using an optical filter or by selecting a material as necessary.

Figure 7:
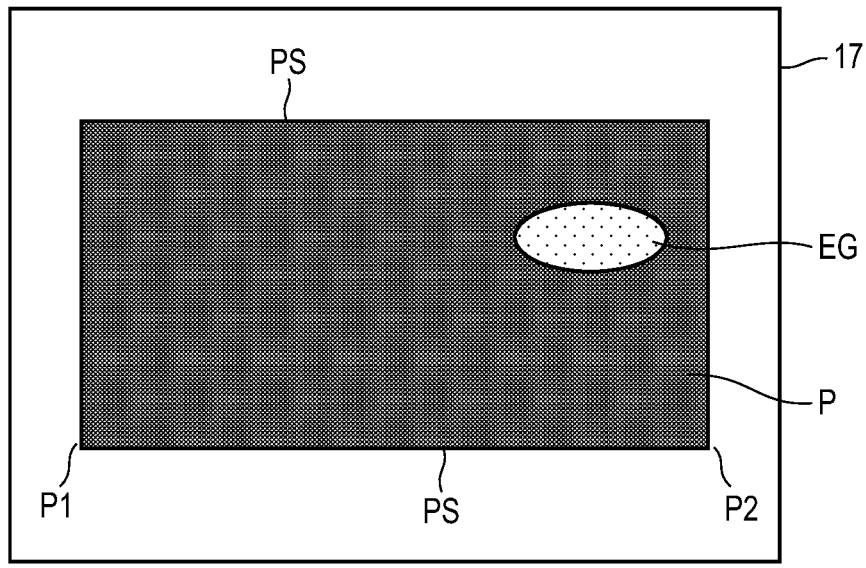
FIG. 7 is a schematic view of an image example read by the image reading device.

FIG. 7 shows an example of a fluorescent image read by the image reading device 10. The illustrated example shows an example of an image imaged without a slide or skew of the bill P. As shown in the figure, when there is no bill P on the fluorescence reference member 17, the entire fluorescence reference member 17 emits light, so that the fluorescence emission itself of the fluorescence reference member 17 (hereinafter referred to as a bright reference) is read as a bright image. While the bill P is passing over the fluorescence reference member 17, the excitation light is blocked by the bill P, so that most of the fluorescence reference member 17 does not emit fluorescence, and the bill P itself does not exhibit fluorescence. Therefore, the passing position of the bill P is read as a black image. However, since both the ends of the fluorescence reference member 17 do not overlap with the bill P while the bill P passes, both the ends of the fluorescence reference member 17 continuously emit fluorescence and are read as a bright image located outside the side edges PS of the bill P. Further, a fluorescent ink print area EG printed on the bill P with fluorescent ink exhibits fluorescence emission and is read as bright information.

Next, boundary portions P1 and P2 between the fluorescence reference member 17 and the bill P in the fluorescent image will be described in more detail. First, the time characteristics of excitation of a phosphor and fluorescence emission will be briefly described.

Figure 8:
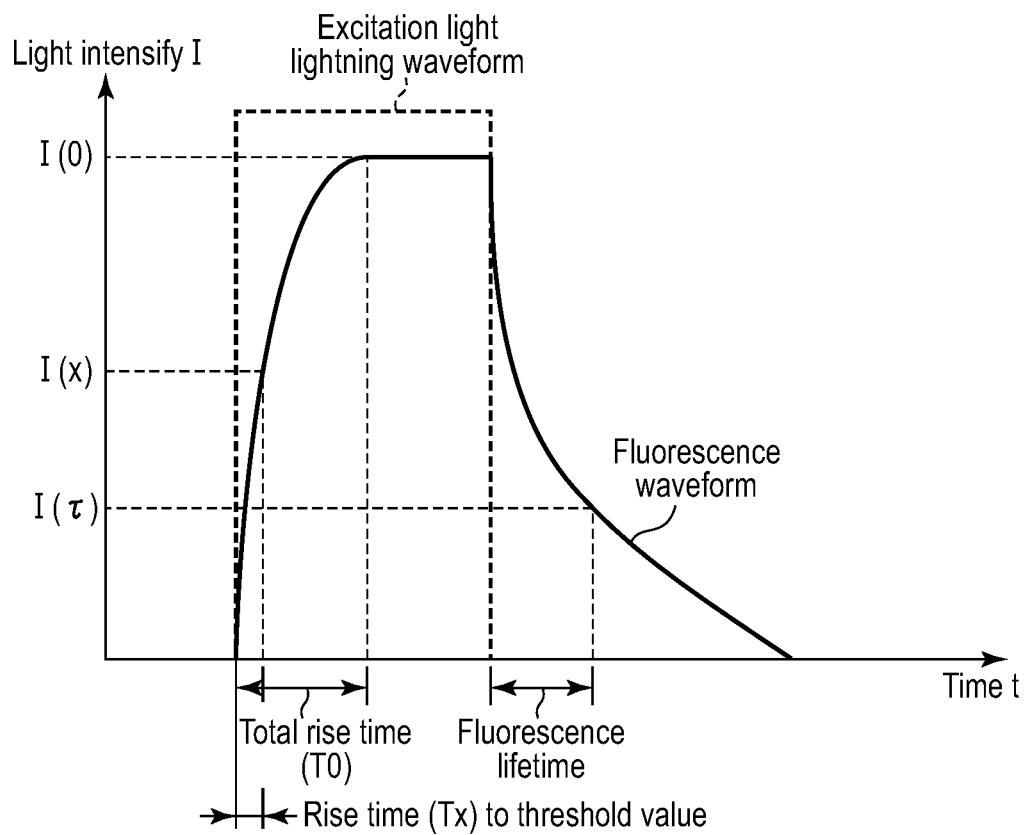
FIG. 8 is a schematic diagram showing the relationship between excitation light illumination and emission of the phosphor.

As shown in FIG. 8, in the phosphor, it takes time to stabilize the intensity of fluorescence emission after the phosphor starts to be irradiated with the excitation illumination (total rise time T0). Further, in the phosphor, it takes time from when the phosphor is no longer irradiated with the excitation light until the fluorescence emission disappears (afterglow), and the time until the fluorescence emission weakens to a certain ratio is referred to as a fluorescence lifetime. These times are determined by the composition of the phosphor and the like.

If $\tau$ is the fluorescence lifetime, Rr is radiative transfer velocity, and Rn is nonradiative transfer velocity, a relationship of $\tau=1/(Rr+Rn)$ is satisfied.

In general, a fluorescence intensity I (t) after a lapse of a time t from when the phosphor is no longer irradiated with the excitation illumination is represented as follows.

$I(t)=I(0)\exp[-t/\tau]$ $I(0)$: Fluorescence intensity during excitation light irradiation From the above, it is necessary to examine the boundary portions P1 and P2 in consideration of the fact that there is a delay in the change in fluorescence of the fluorescence reference member 17 with respect to the change in the excitation light radiated from the light source device 13.

As shown in FIG. 1, the light source device 13 irradiates the fluorescence reference member 17 with excitation light at a certain angle θ with respect to the direction perpendicular to the fluorescence reference member 17. Therefore, first, a case where the light source device 13 is arranged on the upstream side in the conveying direction A with respect to the fluorescence reference member 17 will be described.

Figure 9:
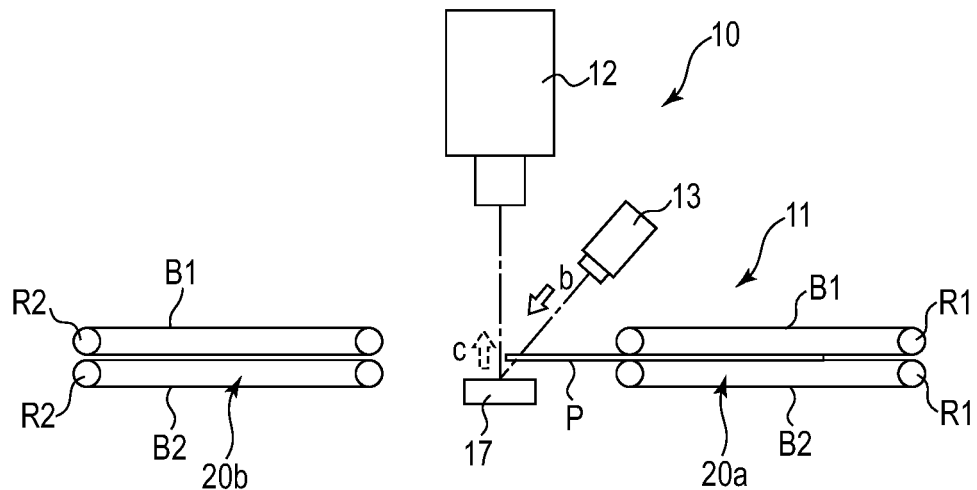
FIG. 9 is a side view showing an operating state of the image reading device.

As shown in FIG. 9, when the excitation light b has an angle θ with respect to the direction perpendicular to the fluorescence reference member 17, a state occurs in which the bill P blocks the excitation light b before the bill P comes directly under the imaging range of the imaging device 12. Therefore, on the imaged fluorescent image, a shadow of the bill P is generated at the boundary P1 on the leading edge side of the bill P in the conveying direction A. However, since the fluorescence reference member 17 has the fluorescence lifetime τ, the shadow reflected in the fluorescent image is reduced by the afterglow.

Figure 10A:
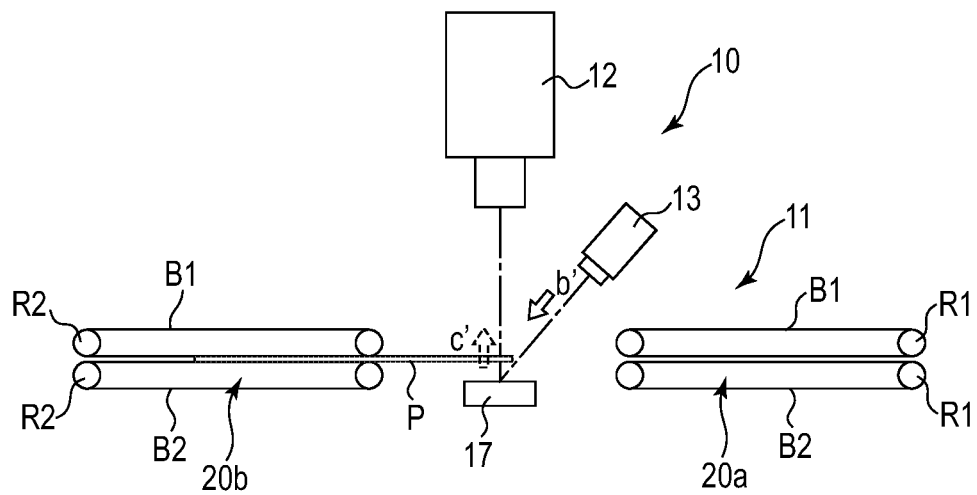
FIG. 10A is a side view showing another operating state of the image reading device.

Further, at the boundary portion P2 on the trailing edge side of the bill P, as shown in FIG. 10A, the fluorescence reference member 17 starts to be irradiated with the excitation light b before the bill P passes directly under the imaging device 12. Therefore, it is possible to reduce the influence of the rise time of the fluorescence reference member 17 on the fluorescent image.

Figure 10B:
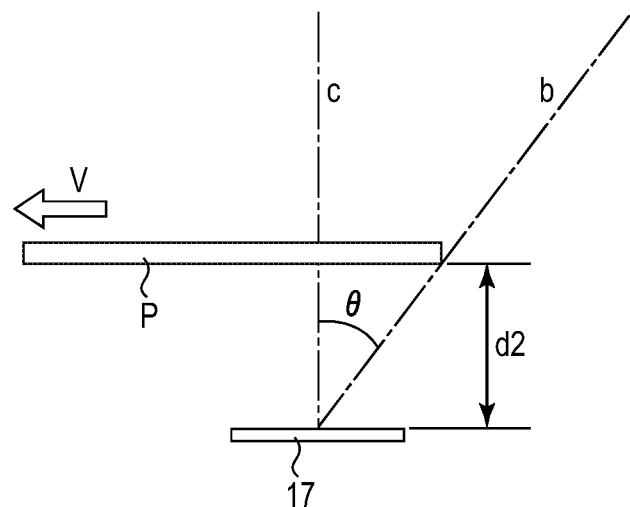
FIG. 10B is an enlarged side view showing the fluorescence reference member portion in FIG. 10A.

FIG. 10B is an enlarged view showing the vicinity of the fluorescence reference member 17 in FIG. 10A.

As shown in the figure, when the irradiation angle of the excitation light b is θ [deg], the distance between the bill P and the fluorescence reference member 17 is d2 [mm], and the conveying speed of the bill P is V [m/sec], ideally, it is desirable that, when the fluorescence reference member 17 begins to appear in the imaging range of the imaging device 12 after the bill P passes, the excitation of the fluorescence reference member 17 has already been completed, that is, the total rise time T0 of the fluorescence emission of the fluorescence reference member 17 is as follows.

$$T0 = ds \times \tan\theta / V$$

In reality, in image processing, a rise time Tx required for the light intensity of the fluorescence emission of the fluorescence reference member 17 to rise up to the point where it exceeds a threshold value I (x) (see FIG. 7) of the fluorescence intensity that can determine the boundary between the emission background and the bill P is achieved by selecting the material of the fluorescence reference member 17 that satisfies the following relationship:

$$Tx = (ds \times \tan\theta + P \times R)/(V \times 10^3) [\sec]$$

where P "pix" is pixel accuracy required for boundary detection, and R "mm/pix" is image resolution.

In an example, when θ=20 deg, ds=5 mm, V=5 m/sec, P=2 pix, and R=0.5 mm/pix, the fluorescence reference member 17 that satisfies a relationship of Tx~5.6×10$^4$ [sec] =0.56 "msec" is selected.

Figure 11:
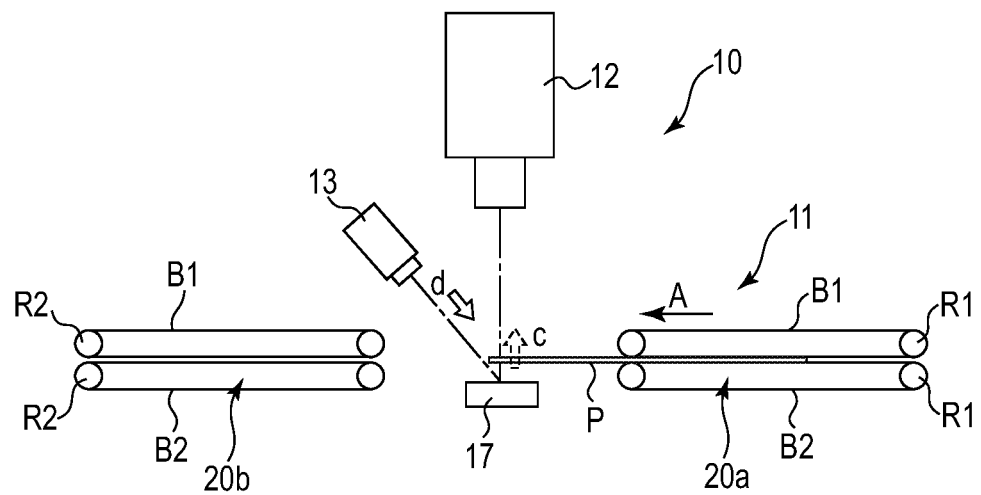
FIG. 11 is a side view showing an operating state of the image reading device in which the arrangement of the light source device is changed.
Figure 12:
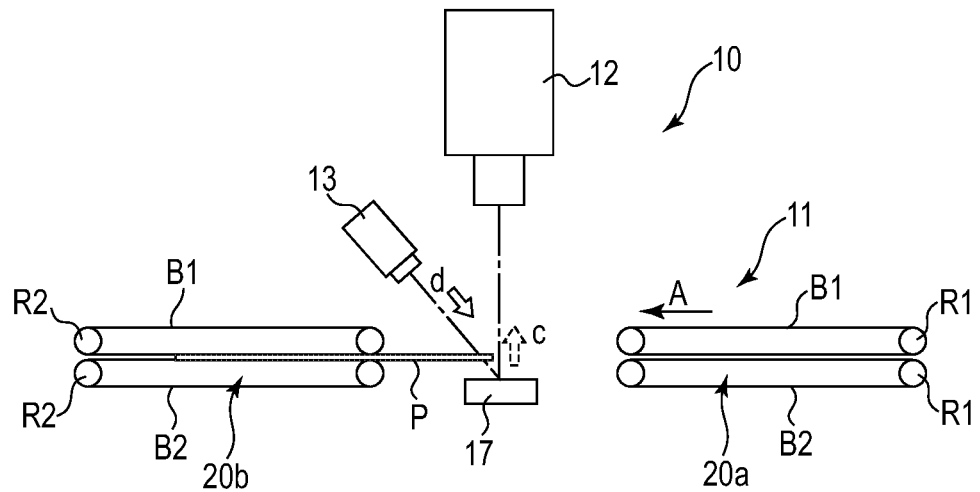
FIG. 12 is a side view showing an operating state of the image reading device in which the arrangement of the light source device is changed.

On the other hand, as shown in FIG. 11, a case where the light source device 13 is arranged on the downstream side in the conveying direction A with respect to the fluorescence reference member 17 will be described. In this case, as shown in FIG. 11, since the excitation light b has an angle with respect to the direction perpendicular to the fluorescence reference member 17, the excitation of the fluorescence reference member 17 continues even when the bill P comes directly under the imaging device 12. Further, as shown in FIG. 12, the state where the fluorescence reference member 17 is not excited even after the bill P passes directly under the imaging device 12 occurs. In the former case, the fluorescent image is not significantly influenced, but in the latter case, the fluorescent image is influenced by the shadow of the excitation illumination by the bill P and the rise time of the fluorescence reference member 17.

From the above, when one light source device 13 is used as the excitation illumination, the boundary between the bill P and the fluorescence reference member 17 and therefore the inclination (shape) of the bill P can be imaged more clearly by arranging the light source device 13 on the upstream side in the conveying direction A with respect to the fluorescence reference member 17.

When the light source device 13 is installed on the upstream side in the conveying direction A, it is desirable that the fluorescence lifetime τ is long in order to reduce the influence of the boundary portion P1. Further, in order to reduce the influence of the boundary portion P2, it is desirable that the rise time of the fluorescence reference member 17 is within the time for the imaging device 12 to scan one line. In general, the longer the fluorescence lifetime τ is, the longer the rise time is. Therefore, in practice, the threshold value when the boundary between the fluorescence reference plate 17 and the bill P is detected from the fluorescent image is appropriately set by selecting such a rise time (fluorescence lifetime) that the fluorescence emission intensity is excited to about 30 to 50% of the stable state within the time for the imaging device 12 to scan one line.

The fluorescence reference member 17 also functions as a reference member for correcting the influence of the output change of the light source device 13 by adjusting the sensitivity of the imaging device 12 or the like.

Figure 13:
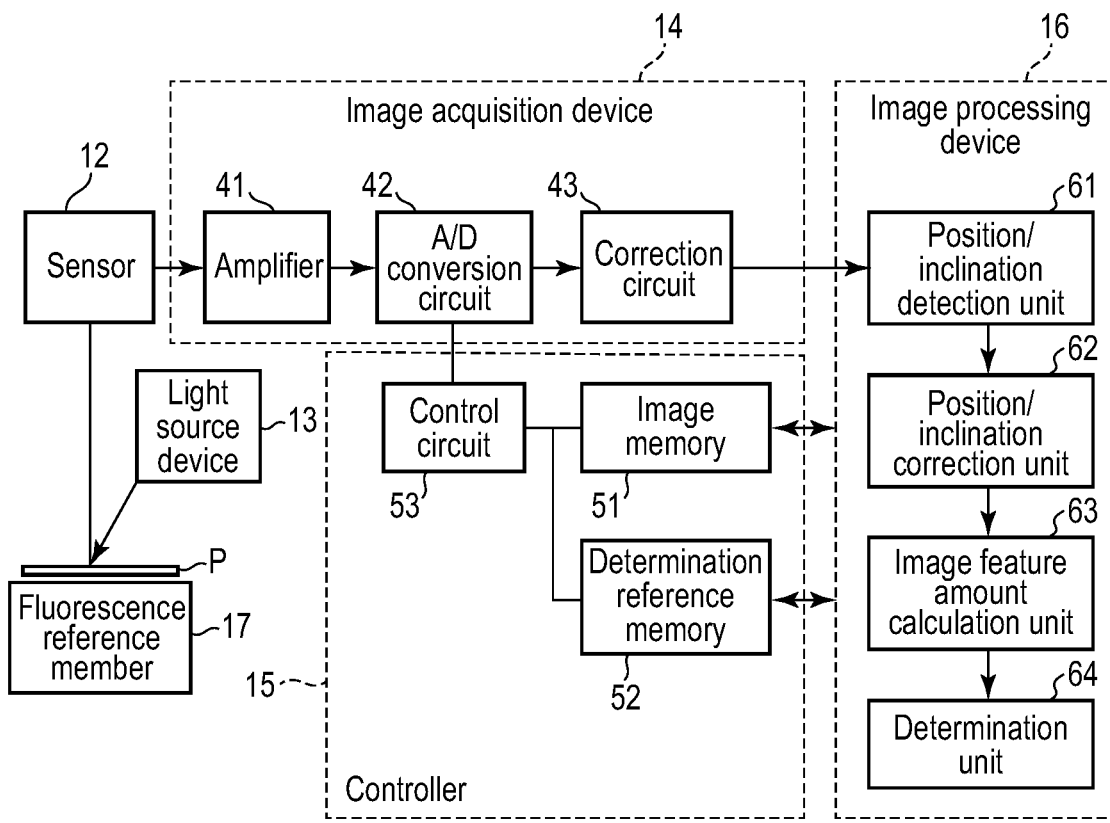
FIG. 13 is a block diagram showing an image acquisition device, a controller, and an image processing device of the image reading device as functional blocks.

FIG. 13 is a block diagram showing the functions of the image acquisition device, the controller, and the image processing device as blocks.

As shown in the figure, the image acquisition device 14 includes an amplifier 41, an analog/digital conversion circuit (A/D conversion circuit) 42, and a correction circuit 43. The amplifier 41 amplifies and outputs an output signal (image data) of the imaging device (line sensor) 12. The A/D conversion circuit 42 converts an analog signal, which is an input signal, into a digital signal and outputs it as an output signal. The correction circuit 43 corrects the unevenness of the input signal based on the characteristics of each imaging element of the imaging device 12 stored in advance. Further, the correction circuit 43 calculates and corrects the amplification factor of the amplifier 41 based on the brightness of the pixels corresponding to the fluorescence reference member 17 in the image received from the imaging device 12 and a specified brightness value. That is, the correction circuit 43 corrects the sensitivity of the imaging device 12 so that the brightness of the pixels corresponding to the fluorescence emission of the fluorescence reference member 17 in the output signal received from the imaging device 12 becomes the specified brightness value.

The controller 15 includes an image memory 51, a determination reference memory 52, and a control circuit 53. The image memory 51 accumulates and stores an image read by the image reading device 10. The determination reference memory 52 stores in advance a plurality of reference images that serve as references for various determinations of the bill P for each type of bill. The control circuit 53 comprehensively controls the imaging device 12, the image acquisition device 14, and the image processing device 16. For example, the control circuit 53 controls the timing at which the imaging device 12 images the imaging range.

The image processing device 16 includes a position/inclination detection unit 61, a position/inclination correction unit 62, an image feature amount calculation unit 63, and a determination unit 64.

FIG. 14 is a flowchart showing an image processing operation by the image processing device 16, and FIG. 15 is a diagram showing processed images corresponding to respective processing configurations.

As shown in the figure, the image processing device 16 acquires an image of the bill and an image of the fluorescence reference member by continuously imaging an image received from the image acquisition device 14, that is, the imaging range (fluorescence emission range) in which the bill P is conveyed by the imaging device 12, under the control of the controller 15 (S1). The position/inclination detection unit 61 detects the boundary (contour) of the acquired bill image, that is, the side edges (long side, short side) of the bill image (S2), and detects the position shift (slide) and inclination (skew) of the bill image by comparing the detected contour and the reference position stored in advance (S3). The position/inclination correction unit 62 corrects (affine transformation) the position and the inclination of the acquired image according to the position shift and the inclination of the bill P detected by the position/inclination detection unit 61 (S4). That is, the position/inclination correction unit 62 corrects the bill image so that the long sides (side edges PS) and the short sides of the bill P in the acquired image coincide with the reference position.

The image feature amount calculation unit 63 compares the image corrected in position and inclination with each reference image of paper sheets stored in the determination reference memory 52, and for example, detects whether or not predetermined fluorescence information EG is printed on the bill P in the image (S5). That is, the image feature amount calculation unit 63 determines that predetermined fluorescent printing is not present in the area on the bill P corresponding to the pixels whose brightness is lower than that of each pixel of the reference image.

The determination unit 64 finally determines the presence/absence of the fluorescence print information EG and whether or not the paper sheet P is in the correct position by comparing the feature amount obtained by the image feature amount calculation unit 63 with the reference amount of determination stored in the determination reference memory 52, and outputs the determination result (S6).

The processing after the above-mentioned image is acquired changes according to the inspection content of the bill P performed by the image reading device 10, and is not limited to the above-mentioned processing.

According to the image reading device of the paper sheet processing apparatus configured as described above, the fluorescence reference member which exhibits fluorescence emission according to the output of the radiated excitation light is installed so as to include the range in which the paper sheet is conveyed, so that it is possible to correct the position and the inclination of the paper sheet to be conveyed and to correct the sensitivity of the imaging device with a simple configuration. Further, by arranging the fluorescence reference member 17 at a position that does not interfere with the conveyance mechanism 11, it is possible to acquire a paper sheet image that is not influenced by the conveyance mechanism 11. Furthermore, by selecting the fluorescent material of the fluorescence reference member based on the fluorescence emission excitation characteristics in consideration of the scanning speed of the imaging device, the boundaries of the paper sheet image can be obtained more clearly, and it is possible to correct the position and the inclination of the paper sheet to be conveyed with high accuracy. As described above, according to the present embodiment, it is possible to provide a paper sheet processing apparatus and a paper sheet processing method having a simple structure capable of detecting and correcting the position and the inclination of the paper sheet by fluorescence detection.

Next, an example of a paper sheet processing apparatus including the above-mentioned image reading device 10 will be described.

Figure 16:
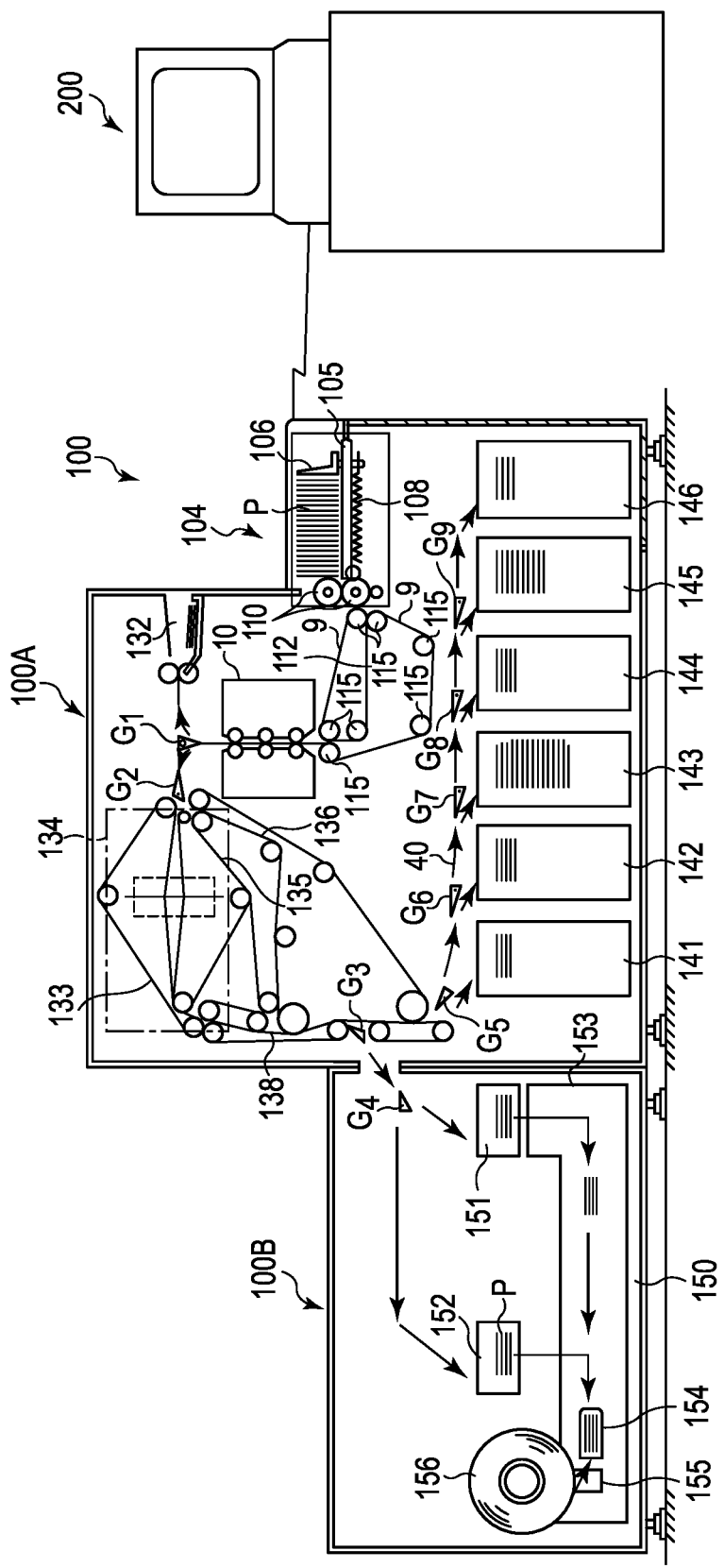
FIG. 16 is a cross-sectional view showing an example of an image processing apparatus including the image reading device.

FIG. 16 is a cross-sectional view showing a schematic configuration of the paper sheet processing apparatus according to the embodiment.

As shown in the figure, the paper sheet processing apparatus comprises a processing device main body 100 and a control device 200 for operating and controlling the processing device main body 100. The number of processing device main bodies 100 controlled by the control device 200 may be one or a plurality. The processing device main body 100 includes a sorting collection device 100A which sorts the bills P as paper sheets according to types such as a type of bill, fitness, etc., and collects the sorted bills P for each type, and a strapping device 100B which straps the bills P for each predetermined number. The processing device main body 100 has a configuration in which any number of strapping devices 100B can be connected to one sorting collection device 100A.

The control device 200 controls the processing device main body 100, sets the operation of the processing device main body 100, manages the processing data by the processing device main body 100, and the like. The control device 200 includes, for example, a personal computer. The control device 200 includes a display unit, an operation unit, a storage unit, and the like.

Next, the internal configuration of the processing device main body 100 will be described.

As shown in FIG. 16, the sorting collection device 100A of the processing device main body 100 includes a loading portion 104 into which a plurality of bills P are loaded. The plurality of bills P in which a plurality of types are mixed are collectively loaded into the loading portion 104. The loading portion 104 includes a stage 105, a backup plate 106, and take-out rollers 110 as a take-in means. The plurality of bills P loaded into the loading portion 104 are placed on the stage 105 and pressed against the take-out rollers 110 by the pack-up plate 106 and a spring 108. A conveyance path 112 is provided in the subsequent stage of the take-out rollers 110. The bills P taken out one by one by the take-out rollers 110 are sequentially supplied to the conveyance path 112.

The image reading device 10 described above is provided on the conveyance path 112. As described above, the image reading device 10 functions as an inspection device which reads the image of the bill P conveyed along the conveyance path 112 and detects the position and the inclination of the bill P. The image reading device 10 determines the orientation of the bill P conveyed along the conveyance path 112 based on the read image. Further, the image reading device 10 determines, based on the read image, whether or not subsequent processing is possible for the bill P conveyed along the conveyance path 112.

A plurality of gates G1 to G9 for selectively switching the conveying direction of the bill P based on the processing result of the image reading device 10 are provided on the conveyance path 112 extending in the subsequent stage of the image reading device 10. Further, a front/back reversing mechanism (front/back reversing portion) 134 is provided along the conveyance path 112 in the subsequent stage. Further, at the rear end of the front-back reversing mechanism 134, a plurality of collection storages 141 to 146 are arranged side by side along the conveyance path 112.

The front-back reversing mechanism 134 includes two sets of conveyance belts 133 and 135. The conveyance belts 133 and 135 form a torsional conveyance path that is rotated by 180° around a central axis from its inlet to its outlet. The bill P that has been reversed to the back side by the image reading device 10 is sorted to the front-back reversing mechanism 134, and is reversed by the conveyance belts 133 and 135.

The bill P that has been reversed by the front-back reversing mechanism 134 and the bill P that is conveyed without passing through the front-back reversing mechanism 134 are sent to the collection storages with the front and back sides aligned. The sent bills P are sorted for each type of bill by the gates G5 to G9, and are collected for each type of bill in any of the corresponding collection storages 141 to 146. Further, some of the sent bills P are sorted to the strapping device 100B by the gate G3.

As shown in FIG. 16, the strapping device 100B comprises a collection storage 151, a collection storage 152, a supply unit 153, a strapping mechanism 154, a printing mechanism 155, and a band supply unit 156. The collection storages 151 and 152 each collect the bills P sent through the gate G4. Each of the collection storages 151 and 152 is provided with a sensor which detects the presence or absence of the bill.

The supply unit 153 supplies a predetermined number of (for example, hundred) bills P collected in the collection storage 151 or 152 to the strapping mechanism 154. The strapping mechanism 154 is a strapping mechanism which straps a bundle of supplied hundred bills with a paper band. The printing mechanism 155 prints desired print data on the paper band used by the strapping mechanism 154. The band supply unit 156 supplies the paper band to the strapping mechanism 154. The bundle of bills P strapped for each predetermined number is carried out to the outside of the device via a conveyor (not shown).

According to the paper sheet processing apparatus 100 configured as described above, it is possible to provide a paper sheet processing apparatus capable of processing the paper sheet stably in such a manner that the inclination of the paper sheet is detected by the image reading device 10 and the image of the paper sheet is read.

In the above embodiment, the image reading device 10 includes the controller 15 and the image processing device 16, but the present invention is not limited to this, and for example, the processing device main body 100 or the control device 200 may include the controller 15 and the image processing device 16.

Next, an image reading device according to another embodiment will be described. In another embodiment described below, the same parts as those in the first embodiment described above are designated by the same reference numerals, detailed description thereof is omitted, and parts different from those in the first embodiment are mainly described in detail.

Second Embodiment

Figure 17:
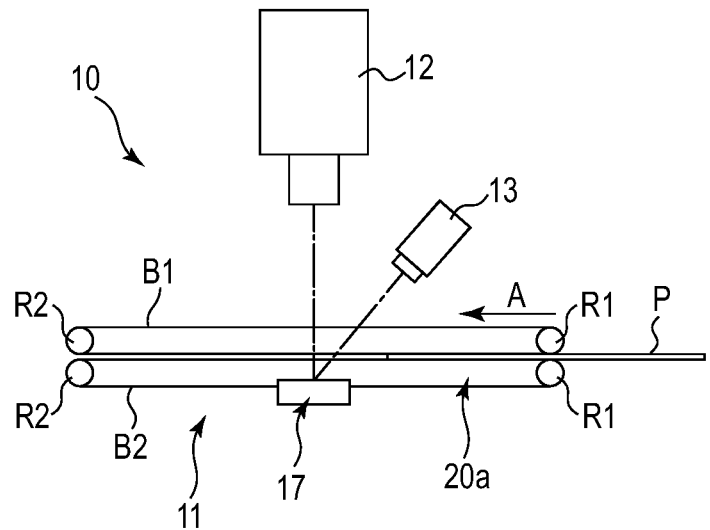
FIG. 17 is a side view schematically showing an image reading device according to a second embodiment.
Figure 18:
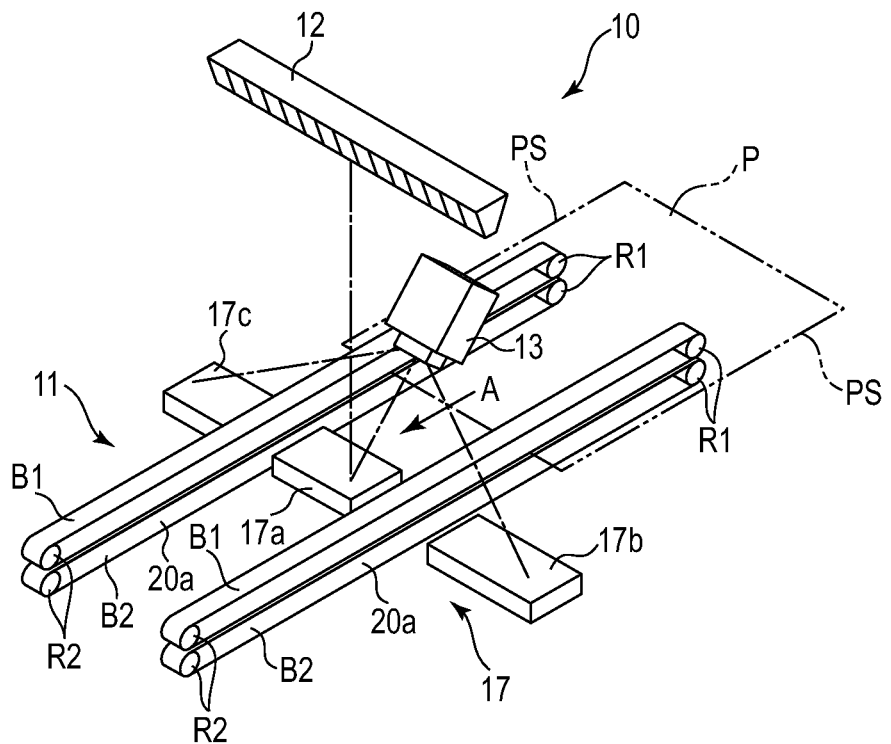
FIG. 18 is a perspective view of the image reading device according to the second embodiment.

FIG. 17 is a side view schematically showing an image reading device according to a second embodiment, and FIG. 18 is a perspective view schematically showing the image reading device according to the second embodiment.

As shown in the figure, according to the second embodiment, a conveyance mechanism 11 of an image reading device 10 includes a pair of first conveyance belt pairs 20a. These first conveyance belt pairs 20a are provided side by side in parallel with each other along a conveyance path, and extend across an imaging range of an imaging device 12.

A fluorescence reference member 17 is divided into a plurality of, for example, three, and includes a first fluorescence reference member 17a, a second fluorescence reference member 17b, and a third fluorescence reference member 17c. The first, second, and third fluorescence reference members (divided fluorescence reference members) 17a, 17b, and 17c are each formed of a quartz glass plate having a surface coated with fluorescent ink, and are each formed in an elongated flat plate shape. The first, second, and third fluorescence reference members 17a, 17b, and 17c are arranged within the imaging range of the imaging device 12 at positions that do not interfere with the first conveyance belt pairs 20a. That is, the first fluorescence reference member 17a is arranged between the pair of first conveyance belt pairs and 20a so as to face the conveyance path. The second and third fluorescence reference members 17b and 17c are each arranged outside the first conveyance belt pairs 20a, and are arranged side by side with the first fluorescence reference member 17a along a direction orthogonal to a conveying direction A. The second and third fluorescence reference members 17b and 17c each extend from the vicinities of the first conveyance belt pairs 20a to the outside of a conveyance path range of the paper sheet P. That is, the second and third fluorescence reference members 17b and 17c are provided at positions facing both side edges PS of a bill P to be conveyed.

Further, the first, second, and third fluorescence reference members 17a, 17b, and 17c are each arranged so that one surface faces parallel to the conveyance path, for example, one surface faces upward in the vertical direction. In the illustrated example, the fluorescence reference member 17 is arranged below the conveyance path.

The imaging device 12 and a light source device 13 are configured in the same manner as in the first embodiment described above.

According to the second embodiment configured as described above, as in the first embodiment described above, the bill P is stably imaged without interfering with the conveyance mechanism 11, and the image of the bill P can be obtained. That is, the contour of the bill P including both the side edges PS can be imaged by using fluorescence emission from the first, second, and third fluorescence reference members 17a, 17b, and 17c, and the position and the inclination of the bill P can be accurately detected. At the same time, the sensitivity of the imaging device 12 can be corrected by using the fluorescence emission from the first, second, and third fluorescence reference members 17a to 17c, and fluorescent ink print information on the bill P can be read. This makes it possible to correct the position and the inclination of the bill P according to the acquired image, and easily determine the presence/absence of fluorescent ink print information and whether or not the bill P is in the correct position.

As described above, according to the second embodiment, it is possible to provide a paper sheet processing apparatus having a simple structure capable of detecting and correcting the position and the inclination of the paper sheet by fluorescence detection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the paper sheets to be processed are not limited to bills, but can be applied to other paper sheets such as marketable securities.

What is claimed is:

1. A paper sheet processing apparatus comprising:
   a conveyance mechanism which conveys a paper sheet with fluorescent ink print information along a conveyance path;
   a fluorescence reference member which includes a fluorescent material which exhibits fluorescence emission at an excitation light wavelength common to the fluorescent ink print information, and is arranged to oppose to the conveyance path including a passing area of the paper sheet;
   a light source device which is arranged on an upstream side of the fluorescence reference member in a conveying direction of the paper sheet and irradiates the fluorescence reference member with excitation light; and an imaging device which images the fluorescence emission of the fluorescence reference member and acquires an image including a contour of the paper sheet passing over the fluorescence reference member and an image of the fluorescent ink print information of the paper sheet, wherein the fluorescence reference member is configured to include a fluorescent material in which a fluorescence emission intensity is excited to about 30 to 50% of a stable state within a time for the imaging device to scan one line.

2. The paper sheet processing apparatus according to claim 1, wherein the light source device is arranged so that its optical axis forms an angle θ with respect to a direction perpendicular to the fluorescence reference member.

3. The paper sheet processing apparatus according to claim 2, wherein when a rise time required for a light intensity of the fluorescence emission of the fluorescence reference member to rise up to a point where it exceeds a threshold value of the fluorescence intensity that can determine a boundary of the paper sheet is Tx, an irradiation angle of the excitation light is θ, a pixel accuracy required for boundary detection is P "pix", an image resolution is R "mm/pix", a distance between the paper sheet and the fluorescence reference member is d2, and a conveying speed of the paper sheet is V, the fluorescence reference member includes a fluorescent material that satisfies the following relationship:

$$Tx=(ds \times \tan \theta + P \times R)/(V \times 10^3)[\sec].$$

4. The paper sheet processing apparatus according to claim 1, wherein the imaging device comprises a plurality of light receiving sensors provided side by side in a direction intersecting, a conveying direction of the paper sheet.

5. The paper sheet processing apparatus according to claim 1, wherein the conveyance mechanism comprises a first conveyance belt pair which extends along the conveyance path, and a second conveyance belt pair which extends along the conveyance path and is arranged so as to be spaced apart from the first conveyance belt pair by a certain distance in the conveying direction of the paper sheet, and the fluorescence reference member is arranged between the first conveyance belt pair and the second conveyance belt pair so as to the conveyance path.

6. The paper sheet processing apparatus according to claim 1, wherein the conveyance mechanism comprises a conveyance belt pair which extends along the conveyance path and across an imaging range of the imaging device, and the fluorescence reference member includes a plurality of divided fluorescence reference members each arranged so as to face the conveyance path at positions outside the conveyance belt pair.

7. The paper sheet processing apparatus according to claim 1, further comprising:

an image acquisition device which acquires an image of the paper sheet and an image of the fluorescence reference member, which are imaged by the imaging device, and corrects light receiving sensitivity of the imaging device according to brightness of the acquired image of the fluorescence reference member; and an image processing device which detects a contour of the image of the paper sheet, detects a position shift and an inclination of the paper sheet by comparing the detected contour and a predetermined reference position, and corrects the position and the inclination of the acquired image to the reference position according to the detected position shift and inclination of the paper sheet image.

8. A paper sheet processing method of processing a paper sheet with fluorescent ink it information, comprising:

conveying, under a state where a fluorescence reference member, including a fluorescent material which exhibits fluorescence emission at an excitation light wavelength common to the fluorescent ink print information, is irradiated with excitation light to emit fluorescence, the paper sheet through a range of the fluorescence emission;

acquiring an image of the paper sheet and an image of the fluorescence reference member by imaging the range of the fluorescence emission through the paper sheet by an imaging device including light receiving sensors while the paper sheet passes through the range of the fluorescence emission, wherein the fluorescence reference member is configured to include a fluorescent material in which a fluorescence emission intensity is excited to about 30 to 50% of a stable state within a time for the device to scan one line;

detecting a contour of the paper sheet from the image of the paper sheet; and calculating a position shift and an inclination of the image of the paper sheet by comparing the detected contour and a reference position.

* * * * *